(12) United States Patent
Conway et al.

(10) Patent No.: US 8,670,433 B2
(45) Date of Patent: Mar. 11, 2014

(54) SYSTEMS AND METHODS FOR ALLOCATING AND TRANSMITTING UPLINK DATA BLOCK TRANSMISSIONS WITH PIGGY-BACKED ACK/NACK BITMAP FIELD

(75) Inventors: Dennis Conway, Mississauga (CA); Satish Venkob, Waterloo (CA); David Philip Hole, Slough (GB)

(73) Assignee: BlackBerry Limited, Waterloo, Ontario (CA)

( * ) Notice: Subject to any disclaimer, the term of this patent is extended or adjusted under 35 U.S.C. 154(b) by 604 days.

(21) Appl. No.: 12/729,534

(22) Filed: Mar. 23, 2010

(65) Prior Publication Data

US 2010/0238910 A1 Sep. 23, 2010

Related U.S. Application Data

(60) Provisional application No. 61/162,550, filed on Mar. 23, 2009.

(51) Int. Cl.
*H04W 72/04* (2009.01)

(52) U.S. Cl.
USPC ........................................................ 370/347

(58) Field of Classification Search
USPC ........................................................ 370/347
See application file for complete search history.

(56) References Cited

U.S. PATENT DOCUMENTS

| | | | |
|---|---|---|---|
| 5,594,738 A | 1/1997 | Crisler et al. | |
| 7,310,336 B2 * | 12/2007 | Malkamaki | 370/392 |
| 8,204,003 B2 | 6/2012 | Hole et al. | |
| 8,218,494 B2 | 7/2012 | Conway et al. | |
| 2008/0056303 A1 | 3/2008 | Sebire et al. | |
| 2009/0086686 A1 | 4/2009 | Rudolf et al. | |
| 2009/0135773 A1 | 5/2009 | Aghili et al. | |
| 2009/0190554 A1 * | 7/2009 | Cho | 370/331 |
| 2010/0203895 A1 * | 8/2010 | Diachina et al. | 455/450 |
| 2012/0236833 A1 | 9/2012 | Conway et al. | |

FOREIGN PATENT DOCUMENTS

| | | |
|---|---|---|
| CA | 2376962 A1 | 10/2002 |
| EP | 1 708 529 A1 | 3/2005 |
| EP | 1708529 A1 | 3/2005 |
| EP | 1780926 | 5/2007 |

(Continued)

OTHER PUBLICATIONS

3RD Generation Partnership Project (3GPP); Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 8)3GPP Standard; 3GPP TS 44.060, No. V8.4.0, Feb. 1, 2009.*

(Continued)

*Primary Examiner* — Huy D Vu
*Assistant Examiner* — Teisha D Hall
(74) *Attorney, Agent, or Firm* — Fish & Richardson P.C.

(57) ABSTRACT

Systems and methods for allocating and transmitting uplink data block transmissions with piggy-backed ACK/NACK bitmap field are provided. In a specific example, a mobile station receives a request for a data block combined with control information (DBCCI). The mobile station responds by transmitting a DBCCI using at least one timeslot corresponding to a timeslot used for the request. At least some of the time, the mobile station sends data blocks in an order different than that would be otherwise used (e.g. block sequence order).

23 Claims, 14 Drawing Sheets

(56) References Cited

FOREIGN PATENT DOCUMENTS

| EP | 1858190 | | 11/2007 |
|---|---|---|---|
| EP | 2091293 | A1 | 8/2009 |
| KR | 1020080051189 | | 6/2008 |
| TW | 2008/03264 | | 1/2008 |
| TW | 2008/43385 | | 11/2008 |
| WO | 2007/120113 | | 10/2007 |
| WO | WO2007120107 | A3 | 12/2007 |
| WO | WO2008029210 | A3 | 5/2008 |
| WO | 2008095748 | A1 | 8/2008 |
| WO | WO2008115114 | A3 | 11/2008 |

OTHER PUBLICATIONS

3rd Generation Partnership Project (3GPP); Technical Specification Group GSM/EDGE Radio Access Network; General Packet Radio Service (GPRS); Mobile Station (MS)-Base Station System (BSS) interface; Radio Link Control/Medium Access Control (RLC/MAC) protocol (Release 8)3GPP STANDARD;3GPP TS 44.060, No. V8.4.0, Feb. 1, 2009 pp. 1-589.*
Notice of Allowance issued in U.S. Appl. No. 13/244,828 on Apr. 6, 2012; 5 pages.
Notice of Acceptance issued in Australian Application No. 2010201122 on Mar. 14, 2012; 3 pages.
Office Action issued in Canadian Application No. 2,697,209 on May 30, 2012; 3 pages.
Office Action issued in Canadian Application No. 2,755,575 on May 30, 2012; 3 pages.
Office Action issued in Korean Application No. 10-2010-0025891 on Mar. 29, 2012; 8 pages.
3GPP TS 44.060 v7.15.0 sections 9.3.3.0, 10.4.4b, 10.4.5, pp. 191, 215-218.
Office Action issued in U.S. Appl. No. 13/244,828 on Nov. 25, 2011; 10 pages.
Korean Office Action based on Korean Application No. 10-2010-0025891, dated Apr. 15, 2011 (Korean Language OA included).
Office Action issued in Japanese Application No. 2010-067039 on Feb. 6, 2012; 9 pages.
"3rd Generation Partnership Project; Technical Specification Group GSM/EDGE Radio Access Network; General Packet Radio Service (GPRS); Mobile Station (MS)—Base Station Control Medium Access Control (RLC/MAC) protocol (Release 8)" 3GGP Standard; 3GGP TS 44.060, 3RD Generation Partnership Project (3GPP), Mobile Competence Centre; 650, Route Des Lucioles; F-06921 Sophia-Antipolis Cedex; France, No. V8.4.0, Feb. 1, 2009, pp. 1-589 XP050378749.
European Search Report dated Jul. 19, 2010 for European Application No. 10157291.5.
International Search Report from PCT Application No. PCT/CA2010/000380, dated Jul. 15, 2010.
Written Opinion and International Search Report from International Application No. PCT/CA2010/000386 dated Jul. 16, 2010.
European Search Report dated Aug. 2, 2010 for European Application No. 10157426.7.
Communication pursuant to Article 94(3) EPC issued in EP Application No. 10157426.7, dated Jul. 7, 2011, 8 pages.
Communication pursuant to Article 94(3) EPC issued in EP Application No. 10157291.5, dated Jul. 12, 2011, 7 pages.
Communication pursuant to Article 94(3) EPC issued in European Application No. 10157291.5 on Jul. 12, 2011, 7 pages.
Office Action issued in U.S. Appl. No. 12/729,505 on Dec. 18, 2012; 6 pages.
Office Action issued in Chinese Application No. 201010129490.7 on Nov. 5, 2012; 16 pages.
Communication Pursuant to Article 94(3) EPC issued in European Application No. 10157291.5 on Dec. 20, 2012; 6 pages.
Communication under Rule 71(3) issued in European Application No. 10157426.7 on Dec. 13, 2012; 54 pages.
Notice of Final Rejection issued in Korean Application No. 10-2010-0225891 on Nov. 23, 2012; 6 pages.
Office Action issued in Korean Application No. 10-2011-7025011 on Jan. 30, 2013; 6 pages.
Office Action issued in U.S. Appl. No. 13/484,071 on May 13, 2013; 9 pages.
Notice of Allowance issued in Canadian Application No. 2,755,575 on Apr. 10, 2013; 1 page.
Office Action issued in Canadian Application No. 2,697,209 on May 16, 2013; 3 pages.
Extended European Search Report issued in European Application No. 13162351.4 on Jun. 17, 2013; 11 pages.
Office Action issued in Korean Application No. 10-2013-0019908 on Jun. 2, 2013; 10 pages.
Office Action issued in Taiwanese Application No. 099108426 on May 27, 2013; 12 pages.
Patent Examination Report No. 1 issued in Australian Application No. 2010228065 on Apr. 5, 2013; 3 pages.
Office Action issued in Chinese Application No. 201010129490.7 on Jul. 31, 2013; 15 pages.
Notice of Allowance issued in Korean Application No. 10-2011-7025011 on Jun. 28, 2013; 1 page.
Summons to Attend Oral Proceedings issued in European Application No. 10157426.7 on Jul. 6, 2012; 9 pages.
Communication Pursuant to Article 94(3) EPC issued in European Application No. 10157291.5 on Jul. 23, 2012; 5 pages.
Notice of Allowance issued in Japanese Application No. 2010-067039 on Jul. 12, 2012; 3 pages.

* cited by examiner

SYSTEMS AND METHODS FOR ALLOCATING AND TRANSMITTING UPLINK DATA BLOCK TRANSMISSIONS WITH PIGGY-BACKED ACK/NACK BITMAP FIELD

This application claims the benefit of U.S. Provisional Application No. 61/162,550 filed Mar. 23, 2009, hereby incorporated by reference in its entirety.

FIELD

1. Field of Application

The application relates to systems and methods for allocating and transmitting uplink data block transmissions with Piggy-backed ACK/NACK bitmap field.

2. Background

Some wireless telecommunications systems employ a time division multiplexing scheme. The transmission time available is divided into slots. By way of example, in GSM (Global System for Mobile Communications) time is divided into sets of eight slots. Each set of eight slots is collectively referred to as a frame.

In this description, assignment refers to signalling used to identify slots that are made available to a given mobile station. The set of slots assigned to a unidirectional data flow is referred to as a TBF (temporary block flow). The TBF is a unidirectional entity: an uplink TBF relates to uplink assignment/allocation and a downlink TBF relates to downlink assignment/allocation.

In this description, an allocation refers to the actual reception/transmission of data on specific slots. An allocation will necessarily be a subset or all of the available assignment. Multiple mobile stations can have the same or overlapping assignments, and allocation will be used to avoid collisions.

With the GSM frame definition, the slot numbering for the uplink is offset from the slot numbering for the downlink such that a downlink slot and an uplink slot with the same number can be assigned and allocated on both the downlink and the uplink without requiring the mobile station to receive and transmit at the same time. For a given mobile station, the same physical time slot in a given frame can be assigned and/or allocated for either the uplink or the downlink, but not both. However, due to the offset numbering scheme described above, slots in a given frame having the same slot number can be assigned and allocated on both the uplink and downlink.

Multiple mobile stations in a given area share these time slots. Whenever each mobile station has data, it will, based on an uplink allocation mechanism, send data in the uplink direction. The network will also send data in the downlink direction on these slots to multiple mobile stations. For example, in a first frame slot 0 may contain data for a first mobile station, while in a next frame, the same slot may contain data for a second mobile station. Since a slot is a very small time unit, a slot may be allocated to a mobile station over multiple consecutive frames. For example, a BTTI (Basic Transmit Time Interval) block consists of a slot allocated over four consecutive frames. For example, frame 1 slot 1, frame 2 slot 1, frame 3 slot 1 and frame 4 slot 1 make up a BTTI block. In some implementations, a frame is approximately 5 ms in duration, such that a BTTI block will span over four frames, or a 20 ms interval. A BTTI TBF is a TBF which uses BTTI blocks.

An RTTI (Reduced Transmit Time Interval) block uses the same frame structure introduced above, but an RTTI block consists of a pair of slots during a first frame, and a pair of slots during the next frame such that an RTTI block will span over two frames or a 10 ms interval. An RTTI TBF is a TBF which uses RTTI blocks. The transmission interval for an RTTI block compared to a BTTI block is reduced by half.

A radio block is the collection of 4 bursts that is used sent to send an RLC/MAC data block, PACCH block, etc. All transmissions referred to in this description are sent as 4-burst radio blocks. For BTTI (basic transmission time interval), a radio block is sent using the same timeslot number in four frames; for RTTI (reduced transmission time interval) it is sent using two timeslots in two frames. A radio block period is then the duration of 4 or 2 TDMA frames in which a radio block is sent. An allocation for an uplink transmission allocates a BTTI block to the same timeslot in each of four TDMA frames or allocates an RTTI block to two timeslots in each of two TDMA frames.

An example of a downlink frame 30 and an uplink frame 32 each divided into 8 timeslots is shown in FIG. 1A. The downlink frame is offset in time from the uplink frame such that a mobile station can receive on a timeslot #n in a downlink frame and transmit a response on a timeslot having the same timeslot #n in an uplink frame without having to transmit and receive simultaneously.

To perform uplink BTTI allocation, the network transmits a USF (uplink state flag) during a downlink BTTI block in a downlink slot of a preceding block period. The mobile station is thereby allocated a timeslot for uplink transmission of an uplink BTTI block that has the same number as that of the downlink slot used to transmit the USF. FIG. 1A shows an example of downlink transmission of a single BTTI block, indicated at 40 which includes the first slot of each of four consecutive downlink frames and a BTTI uplink allocation at 41 which includes the first slot of each of four consecutive uplink frames. In the illustrated example, the four downlink slots #1 of the previous block period (not shown) also contain a USF for the mobile station that allocates BTTI uplink block 41 to the mobile station. USFs in BTTI are sent with BTTI blocks and allocate an uplink block in the BTTI radio block period after the USF is sent. FIG. 1B shows an example of an RTTI downlink transmission generally indicated at 50 and an RTTI uplink transmission generally indicated at 51. In this example, an RTTI block is transmitted to the mobile station in the downlink on timeslots #1, #2, and, by means of USF signalling on timeslots #1, #2 in the previous radio block period (not shown), the mobile station is allocated uplink timeslots #1, #2 for transmission of an uplink RTTI block, these slots being defined as the "corresponding slot pair" or "corresponding PDCH (packet data channel)-pair" to the downlink pair consisting of timeslots #1, #2. While in this example, the uplink slots are the same as for the downlink slots used to transmit USFs for the purpose of uplink allocation, this is not always the case with RTTI allocations. USFs in RTTI USF mode are sent like RTTI blocks (i.e. they occupy a pair of slots over two consecutive frames) and point to the RTTI block on the corresponding uplink timeslots in the two frames after the USF is sent. There is also a hybrid version of RTTI allocation where two BTTI USFs are used to allocate two RTTI blocks. Specifically, a first BTTI USF is used to allocate an RTTI radio block in the first two frames of the four frames that follow the two BTTI USFs, and a second BTTI USF is used to allocate an RRTI block in the second two frames of the four frames the follow the two BTTI USFs.

Historically, more specifically up to and including 3GPP Release 6, a poll by the network using the RRBP (Reserved Radio Block Period) or ES/P (EGPRS Supplementary/Polling) fields in the header of a downlink block performed two functions:

a) it allocates a particular uplink block in the future for the mobile station to transmit;

b) it indicates to the mobile station the contents of that block.

In early specifications (i.e. up to and including 3GPP Release 6), the uplink blocks to be sent by the mobile station in response to a poll are always control blocks sent on the PACCH (Packet Associated Control Channel), typically the response being a downlink ACK/NACK (acknowledgement/negative acknowledgement) message such as an EGPRS Packet Downlink ACK/NACK message. When polled by the network for a PACCH block, it is clear from the specification, as per 3GPP TS 44.060 v7.15.0 section 10.4.5, that the response message must be sent on the same timeslot number as that on which the poll was received. An example of this is shown in FIG. 2. In FIG. 2, a network is indicated at 10, and a mobile station is indicated at 12. The network 10 is shown transmitting a poll for PACCH block at 14 in Frame #x, and Timeslot #n. In the early specifications, the poll is indicated by the contents of the RRBP, ES/P fields. The Frame #x and Timeslot #n simply represent the frame number and timeslot number, as selected by the network, in which the first burst of the radio block containing the poll is transmitted. In response, the mobile station 12 transmits a PACCH block (e.g. EGPRS Packet Downlink ACK/NACK) as indicated at 16 starting in Frame #y, Timeslot #n. The Frame #y and Timeslot #n represent the frame number and timeslot number used by the mobile station to transmit the first burst of the radio block containing the response to the poll. For clarity, the transmission of the subsequent bursts of these radio blocks is not shown. The Timeslot #n is the same as that used by the network to transmit the poll. In addition, the relationship between frame numbers x and y is explicitly specified by the poll message (see e.g. 10.4.4b, 10.4.5 in 3GPP TS 44.060).

In 3GPP Release 7, the possibility was added for a poll to indicate that the mobile shall transmit an RLC/MAC data block with a Piggy-backed ACK/NACK bitmap field (PAN). This is requested by the appropriate setting of bits within the newly defined CES/P (Combined EGPRS Supplementary/Polling) field. Such a poll is included in a downlink data block and points to a frame where the poll response starts. A poll can be sent in BTTI mode, meaning in the same slot for four frames, or RTTI mode, meaning on a pair of slots for two frames. The mobile station knows whether the uplink reserved block uses RTTI or not and can figure out where to send the response.

Normally, allocations for uplink radio resources for the transmission of data blocks are signaled by means of the USF which are sent in the radio block period immediately preceding the radio block period in which the uplink allocations are valid, as detailed above.

In the absence of the need to transmit an RLC/MAC block with PAN, in spite of the relatively short time between the mobile station determining that it has an allocation for an uplink data transfer and the allocated uplink radio block transmission time, this is not a problem for processing/encoding, since it is possible for the mobile station to encode the radio block in advance, since the coding does not depend on exactly when the data block will be transmitted, in particular, in which timeslot number the data block will be transmitted.

Note that polls that request an uplink transmission in a given radio block period are sent much earlier than USFs which allocate resources in the same radio block period. It is possible that a poll and a USF may refer to the same uplink transmission opportunity. This is taken into account by the network when performing scheduling.

DETAILED DESCRIPTION

Figure 1A:
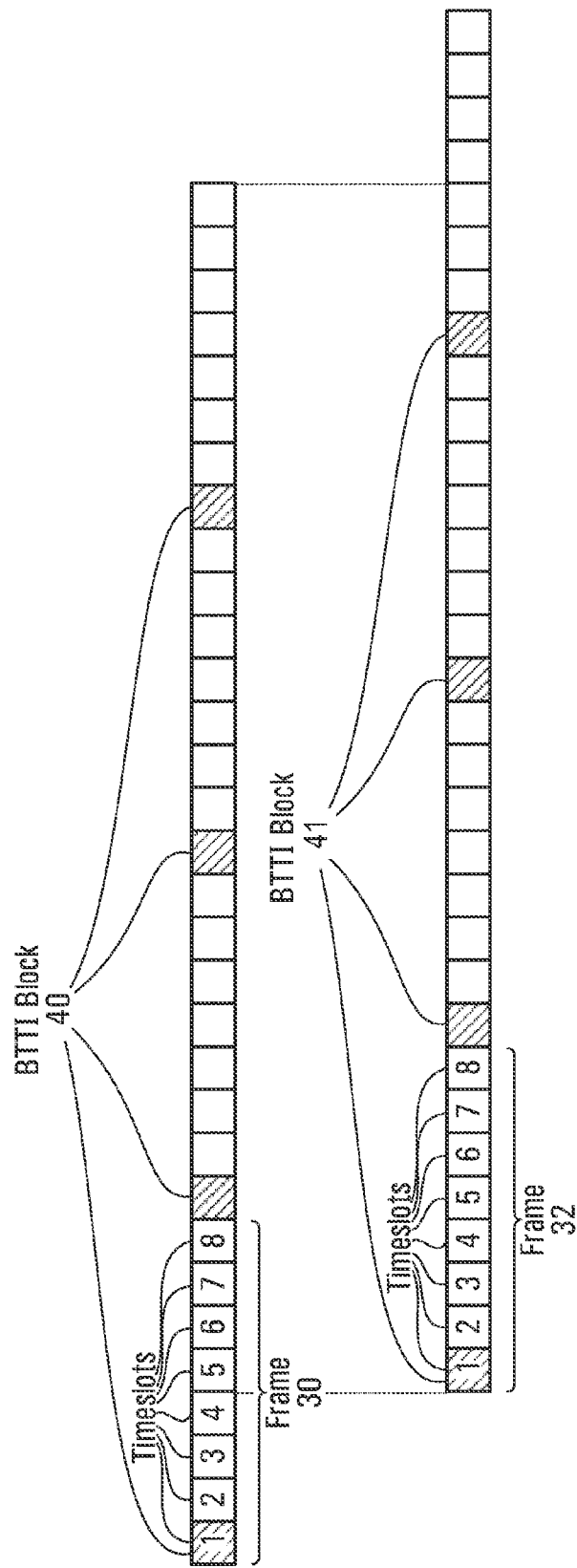
FIG. 1A is a schematic diagram of a BTTI block.
Figure 1B:
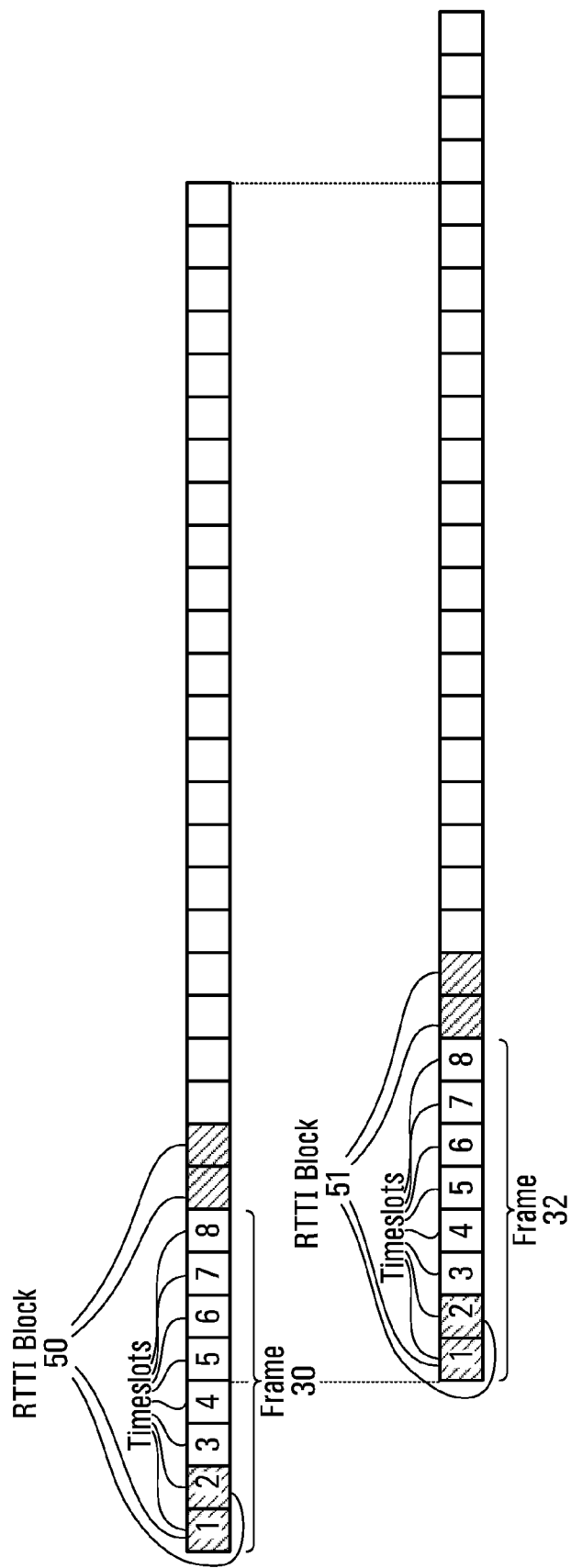
FIG. 1B is a schematic diagram of an RTTI block.

A broad aspect of the disclosure provides a method in a mobile station, the method comprising receiving over a wireless channel a request for a DBCCI (Data Block Combined with Control Information); transmitting a DBCCI in response to the request using at least one timeslot corresponding to a timeslot used for the request for DBCCI; sending data blocks out of a particular order within at least one radio block period where the mobile station is responding to a request for DBCCI, wherein the particular order is the order to be applied to uplink data block transmission if there is no control information to be sent with a data block.

In some embodiments, transmitting a DBCCI in response to the request using at least one timeslot corresponding to a timeslot used for the request for DBCCI comprises transmitting a BTTI block using an uplink slot having the same number as a downlink slot used for the request.

In some embodiments, transmitting a DBCCI in response to the request using at least one timeslot corresponding to a timeslot used for the request for DBCCI comprises transmitting an RTTI block using an uplink slot pair corresponding with a downlink slot pair used for the request.

In some embodiments, the method further comprises receiving at least one UADB (uplink allocation for data block), each UADB indicating an allocation of a respective uplink block; transmitting within a given radio block period one or more uplink data blocks using the uplink timeslot(s) allocated by the at least one UADB other than the timeslot used to transmit the DBCCI, each such data block having a higher block sequence number than the block sequence number(s) of data block(s) being sent as part of the DBCCI.

In some embodiments, the particular order involves initial transmissions occurring in block sequence number order.

In some embodiments, the request for a DBCCI (Data Block Combined with Control Information) is a poll for RLC (radio link control) data block+PAN (piggy backed ACK/NACK).

In some embodiments, each UADB is a USF (uplink state flag).

Another aspect of the disclosure provides a computer readable medium having computer executable instructions stored thereon for execution by a mobile station which when executed, cause the mobile station to perform any of the methods summarized above.

Another aspect of the disclosure provides a mobile station configured to perform any of the methods summarized above.

It is not clear that the timeslot(s) used for the response to a poll indicating an RLC/MAC data block with a PAN needs to correspond with that (those) used for the poll.

Normal allocations for uplink radio resources are signaled by means of the USF as defined above. It seems that resources for transmission of an uplink data block can also be signalled by means of a poll for an RLC/MAC data block plus PAN as described above. However, it is not clear whether the poll alone is sufficient to indicate the allocation for the RLC/MAC data block, or whether instead the network must abide by pre-existing rules that an uplink allocation for a data block transmission must be signaled by means of the USF even if a poll has been sent for an RLC data block with PAN for the same uplink block.

In a case where a mobile station is assigned one or more timeslots in the uplink direction (i.e. has an uplink TBF ongoing), and the mobile station has been polled by the network and ordered to send an RLC data block together with a PAN in a given radio block period, it may not be possible (or at least, may be very difficult) for the mobile station to encode data blocks correctly in advance of the decoding of the USF fields which allocate resources in the radio block period in which the response to the poll is sent, if the mobile station is required to obey both a block sequencing rule and a PAN timeslot rule as follows:

block sequencing rule: ensure transmission of data blocks in accordance with a particular order within a radio block period (for example the order specified for the EGPRS RLC protocol see e.g. 3GPP TS 44.060 subclause 9.1.3.2.1 version 7.15.0; for example, for the initial transmission of two blocks, ensure that a data block with sequence number b is transmitted starting on a lower-numbered timeslot that a block with sequence number c, if b<c) and PAN timeslot rule: transmit the PAN on the timeslot with the same number as that used for the poll.

The block sequencing rule is currently mandated in many cases in respect of data blocks sent using unacknowledged mode operation. See for example 3GPP TS 44.060 9.3.3.0. It is not clear from 3GPP TS 44.060 v7.15.0 whether there is any specific restriction on which timeslot the RLC data block containing PAN is to be transmitted in the uplink direction in the case where the mobile station is allocated, by means of USF signalling, one or more uplink radio blocks in the radio block period in which the poll response is to be sent, in addition to the radio block allocated by the poll.

RLC Data Blocks (including any PANs to be combined with data blocks) are typically encoded before the number of uplink blocks that are allocated to the mobile station is known (i.e. before the USFs which signal the uplink allocation have been decoded). However, if the block sequencing rule and the PAN timeslot rule must be followed in respect of polls for PAN, the mobile station will not be able to determine which data block should have a PAN combined with it in when the blocks are encoded in advance of knowing the number of uplink timeslots allocated to the mobile station is known, because the location of the PAN depends on how many uplink timeslots are allocated to the mobile station which have a lower-number timeslot number than the timeslot number on which the poll was received.

Figure 3:
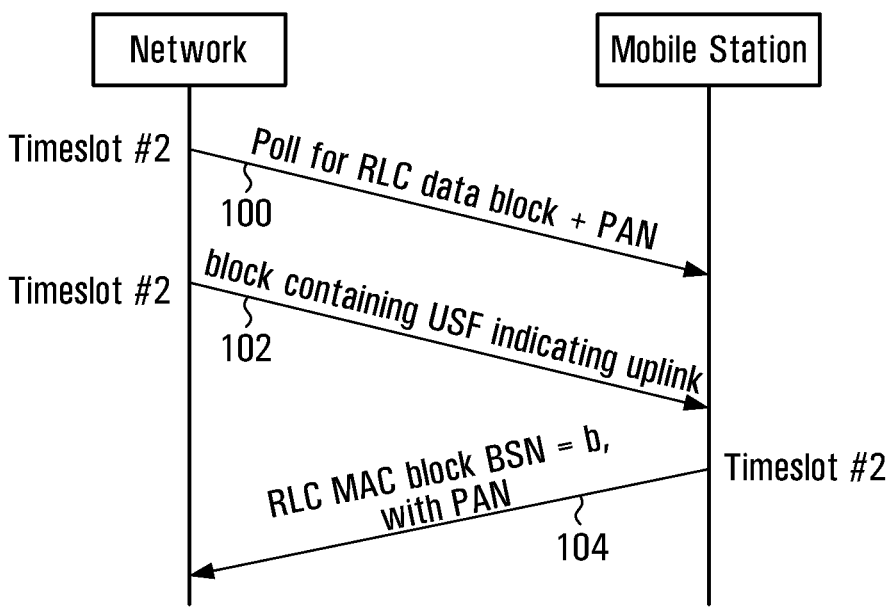
FIG. 3 is a message exchange diagram for a poll for RLC data block+PAN showing the PAN transmitted in timeslot 2 with block BSN=b.
Figure 4:
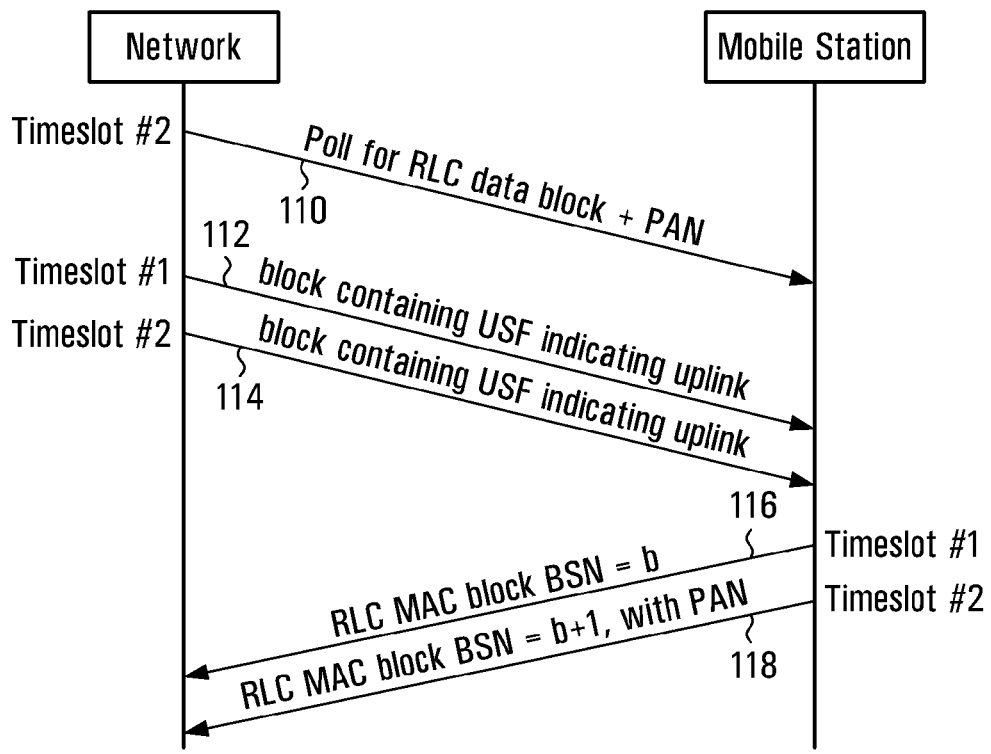
FIG. 4 is a message exchange diagram for a poll for RLC data block+PAN showing the PAN transmitted in timeslot 2 with block BSN=b+1.

Consider the following examples, which illustrate the problem in the case the timeslot number used for a response is expected to be the same as that used for the poll, and data blocks are required to be transmitted in order. Referring to FIG. 3, in a first example, the network transmits a poll for RLC data block+PAN in timeslot #2 at 100. Later, the network transmits a block containing a USF indicating an uplink assignment for timeslot #2 at 102. The USF refers to the same timeslot as the poll, assuming the response to the poll needs to be on the same timeslot. In response, the mobile station transmits an RLC/MAC data block BSN (block sequence number) =b with PAN at 104. The nomenclature BSN=b simply means that the block has some block sequence number. This becomes important when multiple blocks are considered, and the ordering of blocks is a factor. Referring now to FIG. 4, in a second example, the network transmits a poll for RLC data block+PAN in timeslot #2 at 110. Later, the network transmits a block containing a USF indicating an uplink assignment of timeslot #1. Then, the network transmits a block containing a USF indicating an uplink assignment of timeslot #2. In response, the mobile station transmits an RLC/MAC block BSN=b in timeslot #1 at 116, and the mobile station transmits an RLC/MAC block with BSN=b+1 with PAN in timeslot #2 at 118. It can be seen that the ordering of RLC blocks has been respected in that block b is transmitted before block b+1; it is also seen that the requirement to transmit the response to the poll on the same timeslot as the poll has also been respected in that the RLC/MAC block+PAN is sent in timeslot #2.

By comparing FIG. 3 and FIG. 4, it can be seen that in FIG. 3, the PAN is transmitted along with RLC block having BSN=b, whereas in FIG. 4, the PAN is transmitted along with RLC block having BSN=b+1. Until the USFs have been received, the mobile station cannot tell which of the above examples will occur. From these examples, it can clearly be seen that if the timeslot number on which the PAN is sent is expected to be the same as that used for the poll, and data blocks are required to be transmitted in order, the mobile station cannot be sure until after it has received the USFs, whether the PAN is to be encoded with radio block with BSN=b, or with radio block with BSN=b+1. Given the short time between the end of receiving the blocks containing the USF and the beginning of the transmission of blocks (approximately 1 TDMA frame period), it is very difficult for the mobile station to encode the data blocks in such a short amount of time.

Various embodiments are provided that give the mobile station the option of being able to encode a data block in advance of receiving the USF which triggers the transmission of that data block notwithstanding receipt of a poll for a data block plus PAN. In some embodiments, the configuration of the mobile station to act in one of these ways is achieved through the installation of appropriate software, firmware, hardware on the mobile device during device manufacture or device provisioning. In other embodiments, the mobile station is configured to behave in one of these ways through over the air signalling.

Some embodiments described herein refer to a requirement or configuration of a mobile station such that that blocks are transmitted in order according to sequential block sequence number, such that a block with a higher block sequence number is not transmitted before a block with a lower block sequence number. More generally, embodiments corresponding with these embodiments are provided in which configuration or requirement this requirement is replaced with a configuration or requirement that the blocks be transmitted according to a particular order (which may or may not be in sequential order of block sequence number), to allow for retransmissions for example. Transmitting in sequential order is a special case of transmitting in a particular order. In some embodiments, the particular order is the order to be applied to uplink data block transmission if there is no PAN to be sent. In some embodiments, the particular order involves initial transmissions occurring in block sequence number order.

Some embodiments described herein refer to a requirement or configuration of the mobile station to allow it to transmit blocks out of sequential order, i.e. not according to sequential block sequence number, such that a block with a higher block sequence number may be transmitted before a block with a lower block sequence number. More generally, embodiments corresponding with these embodiments are provided in which this configuration or requirement is replaced with a configuration or requirement of the mobile station to allow it to transmit blocks out of the particular order, whatever that may be. The particular order may or may not be in sequential order of block sequence number. This can allow for retransmissions for example. Transmitting out of sequential order is a special case of transmitting out of a particular order.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

FIRST EMBODIMENT

Configure Mobile Station to be Allowed to Send Out of Order RLC Data Blocks within a Radio Block Period Where it is Responding to a Poll for PAN In a first embodiment, in order to allow the mobile station the option of being able to encode data blocks in advance, the mobile station is configured to transmit a response to a poll containing a PAN using an uplink timeslot having the same timeslot number as used for the poll, and to be allowed to send out of order RLC data blocks within a radio block period where it is responding to a poll for PAN. In this case the network might have to re-order blocks received in such a radio block period.

Figure 2:
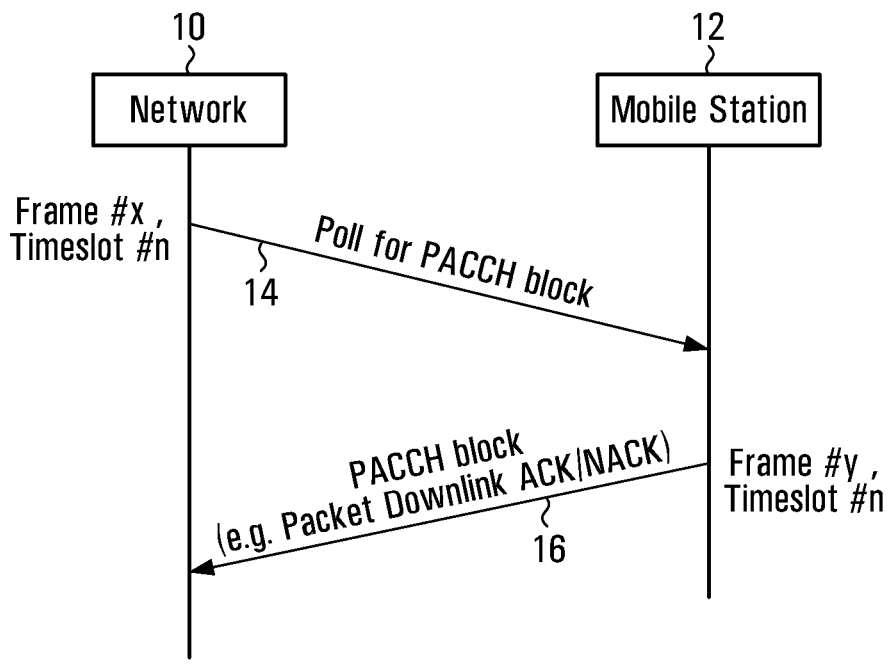
FIG. 2 is a message exchange diagram for a poll for a PACCH block.
Figure 5:
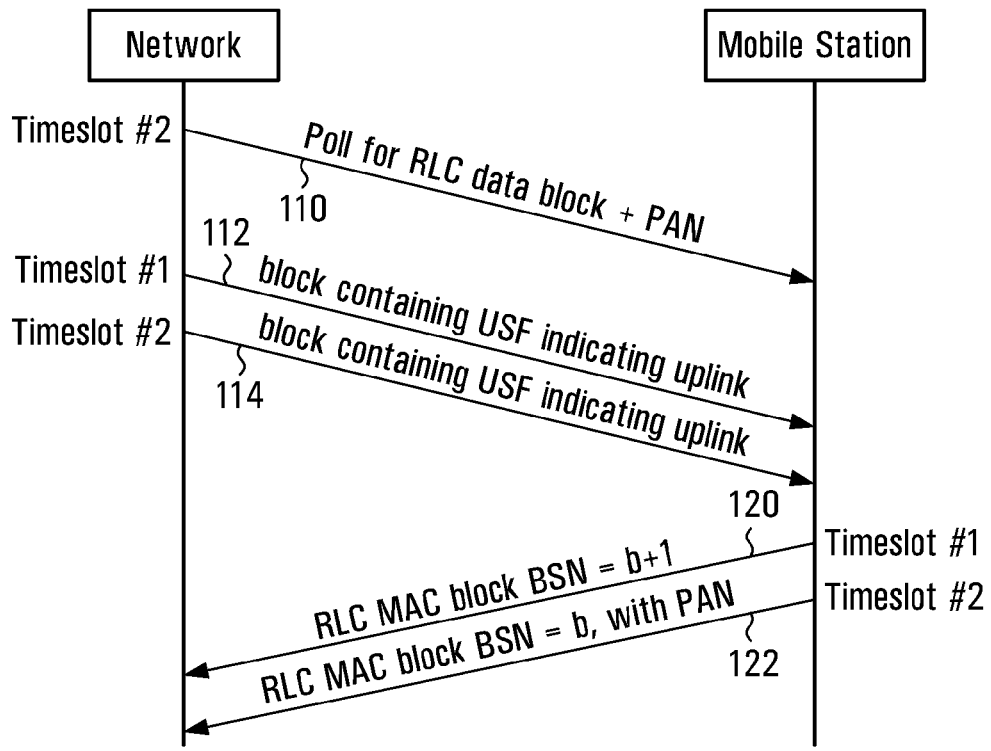
FIGS. 5 to 7 are message exchange diagrams for a poll for RLC data block+PAN in accordance with embodiments of the application.

Assuming network transmissions as in FIG. 2 described above, the mobile station behaviour is the same as in FIG. 2. Assuming network transmissions as in FIG. 3 described above, the mobile station response is as depicted in FIG. 5. In timeslot #1, the mobile station transmits an RLC/MAC block with BSN=b+1, as indicated at 120. In timeslot #2, the mobile station transmits an RLC/MAC block with BSN=b with PAN, as indicated at 122. Here, the timeslot numbering is respected, as the PAN is transmitted in timeslot #2, the same number as the timeslot used for the poll. However, the RLC blocks are transmitted out of sequence, with the block with BSN=b+1 being transmitted before the block with BSN=b. However, with this approach, the mobile station can encode the RLC/MAC block with BSN=b+PAN upon receipt of the poll, without needing to wait for USFs. The mobile station can also pre-encode the RLC/MAC block with BSN=b+1.

Figure 11:
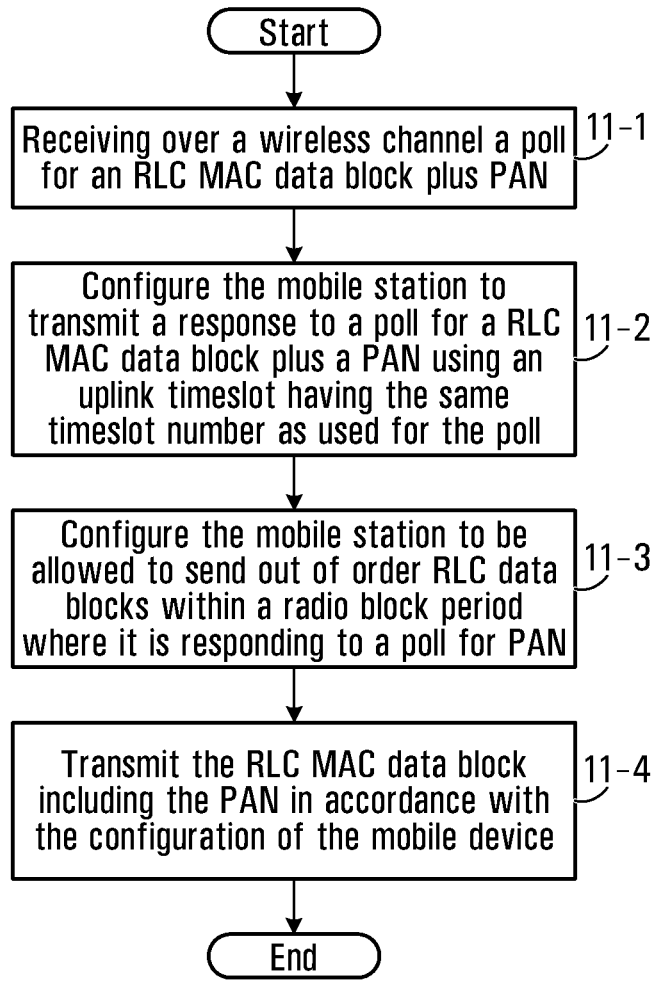
FIGS. 11-15 are flowcharts of methods of processing the receipt of a poll for RLC data block+PAN by a mobile station.

A flowchart of a method corresponding to this embodiment is shown in FIG. 11. The method begins at block 11-1 with receiving over a wireless channel a poll for an RLC/MAC data block plus PAN. In block 11-2, the mobile station is configured to transmit a response to a poll for an RLC/MAC data block plus a PAN using an uplink timeslot having the same timeslot number as used for the poll. In block 11-3, the mobile station is configured to be allowed to send out of order RLC data blocks within a radio block period where it is responding to a poll for PAN. In block 11-4, the mobile station transmits the RLC/MAC data block including the PAN in accordance with the configuration of the mobile device. In some embodiments, the method further includes the mobile station encoding the RLC/MAC data block including a PAN in advance of knowing which, if any, USF will be received to allocate an uplink data block transmission in the same timeslot allocated by the poll, and in advance of knowing which, if any, USF will be received to allocate uplink data block transmission in any timeslot lower than the timeslot allocated by the poll within the same block period.

SECOND EMBODIMENT

Configure Mobile station to Transmit the RLC Data Block with PAN in the Radio Block Defined by the First Allocated Time Slot Irrespective of within which Time Slot the Poll was Received In some embodiments, in order to allow the mobile station the option of being able to encode data blocks in advance, the mobile station is configured to respect the order of transmission of RLC data blocks, and to transmit the RLC Data block with PAN in the radio block defined by the first allocated timeslot irrespective of within which timeslot the poll was received.

Figure 6:
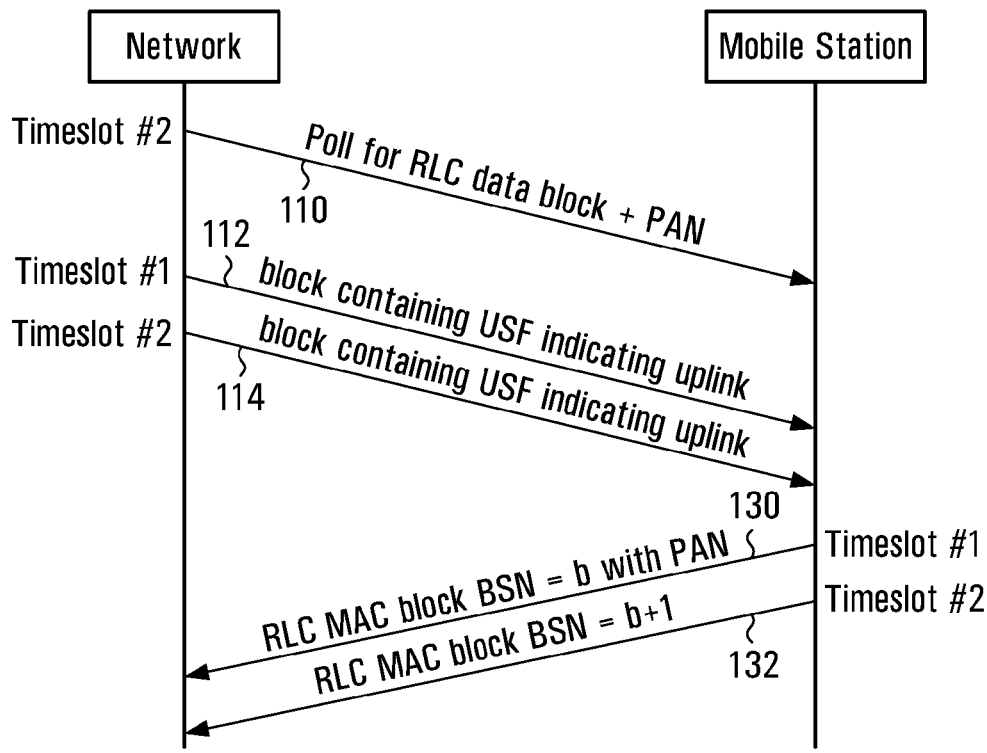

Assuming network transmissions as in FIG. 2 above, the mobile station behaviour is the same as in FIG. 2. Assuming network transmissions as in FIG. 3, the mobile station response is as depicted in FIG. 6. In timeslot #1, the mobile station transmits an RLC/MAC block with BSN=b with PAN, as indicated at 130. In timeslot #2, the mobile station transmits an RLC/MAC block with BSN=b+1, as indicated at 132. Here, the timeslot numbering is not respected, as the PAN is transmitted in timeslot #1, not the same number as the timeslot used for the poll. However, the RLC blocks are transmitted in sequence, with the block with BSN=b being transmitted before the block with BSN=b+1. However, with this approach, the mobile station can encode the RLC/MAC block with BSN=b+PAN upon receipt of the poll, without needing to wait for USFs. The mobile station can also pre-encode the RLC/MAC block with BSN=b+1.

Figure 12:
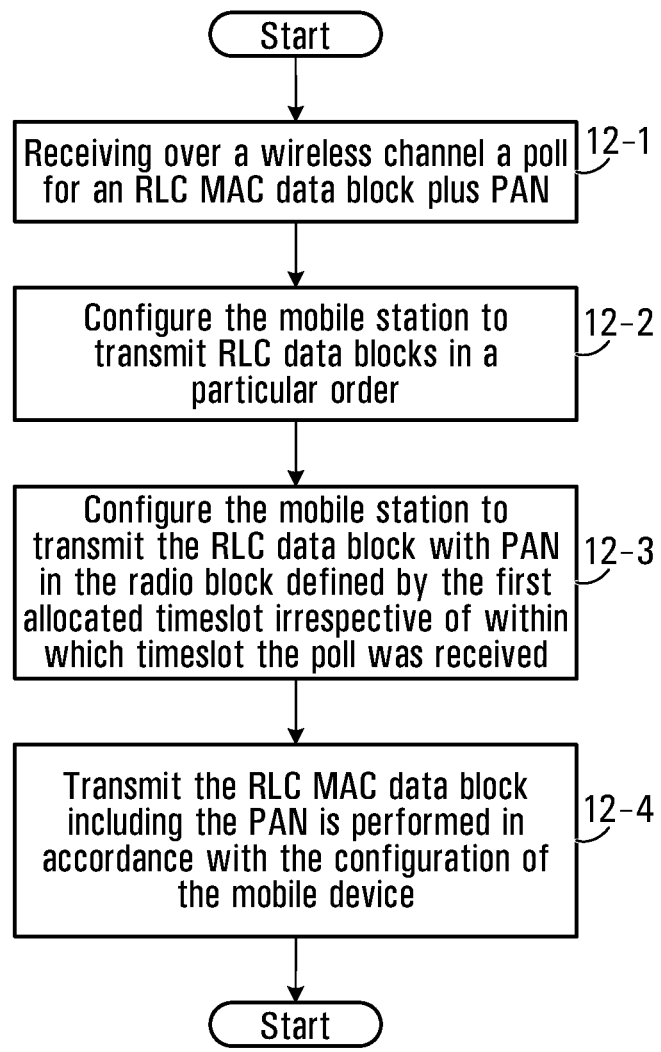

A flowchart of a method corresponding to this embodiment is shown in FIG. 12. The method begins at block 12-1 with receiving over a wireless channel a poll for an RLC/MAC data block plus PAN. In block 12-2, the mobile station is configured to transmit RLC data blocks in order within a radio block period, independent of whether an RLC block with PAN is transmitted. In block 12-3, the mobile station is configured to transmit the RLC Data block with PAN in the radio block defined by the first allocated timeslot irrespective of within which timeslot the poll was received. In block 12-4, the mobile station transmits the RLC/MAC data block including the PAN in accordance with the configuration of the mobile device. In some embodiments, the method further includes the mobile station encoding the RLC/MAC data block including a PAN in advance of knowing which, if any, USF will be received to allocate an uplink data block transmission in the same timeslot allocated by the poll, and in advance of knowing which, if any, USF will be received to allocate uplink data block transmission in any timeslot lower than the timeslot allocated by the poll within the same block period.

THIRD EMBODIMENT

Perform Scheduling at Network to Ensure PAN is to be Transmitted on First UL Timeslot of those Allocated In another embodiment, conversely to second embodiment described above, the PAN is to be sent on the same timeslot as that on which the poll was received, and block sequence numbers are expected to be respected. However the network is responsible for polling for PAN and allocating uplink blocks so as to ensure that, considering a radio block period in which a PAN is to be sent, the PAN is to be transmitted on the first uplink timeslot of those allocated.

Figure 7:
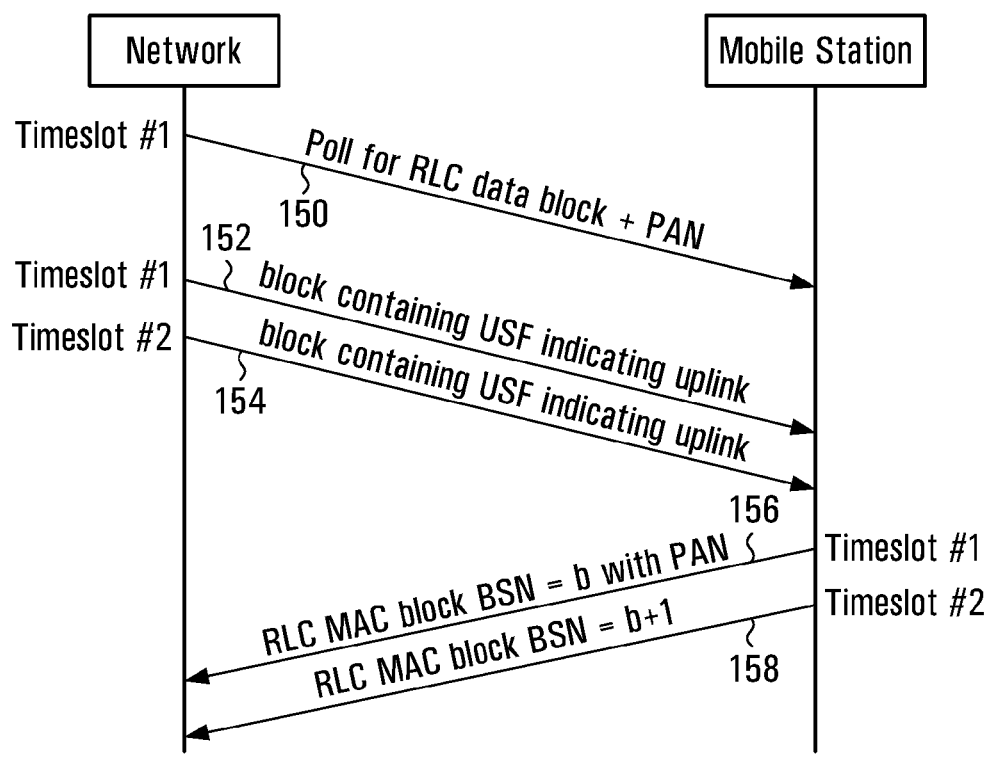

Assuming network transmissions as in FIG. 2 above, the mobile station behaviour is the same as in FIG. 2. The network behaviour depicted in FIG. 3 would not be allowed for with this embodiment. Rather, the network behaviour depicted in FIG. 7 is implemented. In this case, the network either decides in advance how many slots are to be allocated, and polls for the PAN in the first of these slots, or, when determining which radio blocks to allocate to the mobile by means of USF signalling, takes account of the previously sent poll and does not allocate by means of USF signalling any timeslots lower than that on which the poll was sent. Assuming that timeslots #1 and #2 are to be allocated (just a specific example), the poll for PAN would be transmitted on timeslot #1. In FIG. 7, the network transmits a Poll for RLC data block+PAN in timeslot #1 at 150. Later, the network transmits a block containing a USF 152 indicating an uplink assignment of timeslot #1. Then, the network transmits a block containing a USF 154 indicating an uplink assignment of timeslot #2. In response, the mobile station transmits an RLC/MAC block BSN=b with PAN in timeslot #1 at 156, and the mobile station transmits an RLC/MAC block with BSN=b+1 in timeslot #2 at 158. It can be seen that the ordering of RLC blocks has been respected in that block b is transmitted before block b+1; it is also seen that the transmission of the response to the poll on the same timeslot as the poll has also been respected in that the RLC+PAN is sent in timeslot #1. However, the difference between this example and the example of FIG. 4 is that here the mobile station can encode the next block with PAN as soon as it receives the poll without waiting to see which block to encode together with the PAN as was the case with FIG. 4.

Figure 13:
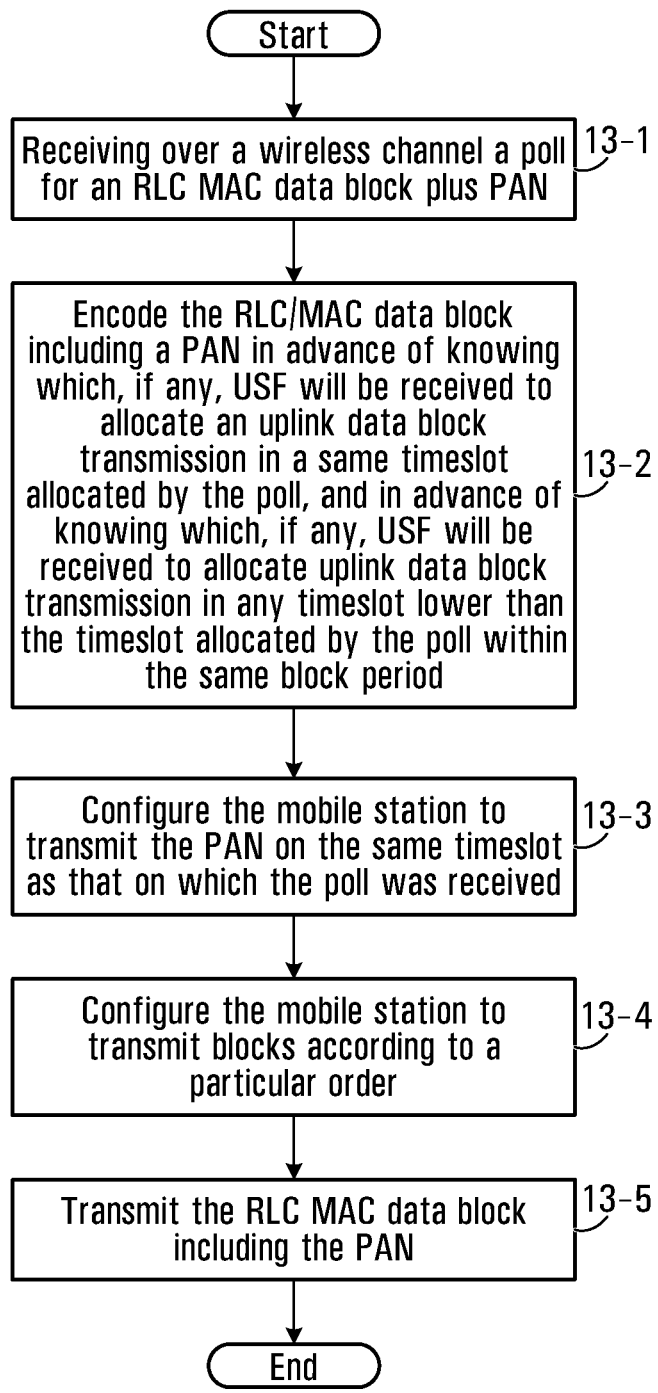

A flowchart of a method corresponding to this embodiment is shown in FIG. 13. The method begins at block 13-1 with receiving over a wireless channel a poll for an RLC/MAC data block plus PAN. In block 13-2, the mobile station encodes the RLC/MAC data block including a PAN in advance of knowing which, if any, USF will be received to allocate an uplink data block transmission in the same timeslot allocated by the poll, and in advance of knowing which, if any, USF will be received to allocate uplink data block transmission in any timeslot lower than the timeslot allocated by the poll within the same block period. In block 13-3, the mobile station is configured to transmit the PAN on the same timeslot as that on which the poll was received. In block 13-4, the mobile station is configured to transmit blocks according to a particular order. In block 13-5, the mobile station transmits the RLC/MAC data block including the PAN.

Figure 16:
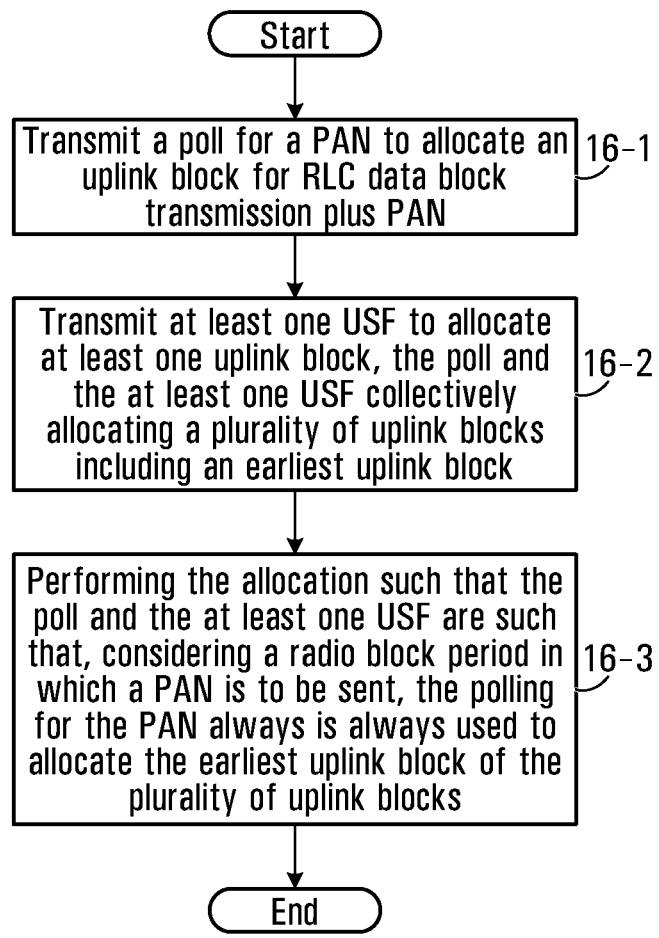
FIG. 16 is a flowchart of method of performing scheduling in a network.

A flowchart of a method corresponding to this embodiment is shown in FIG. 16 for execution by the network. The method begins at block 16-1 with transmitting a poll for a PAN to allocate an uplink block for RLC data block transmission plus PAN. In block 16-2, the network transmits at least one USF to allocate at least one uplink block, the poll and the at least one USF collectively allocating a plurality of uplink blocks including an earliest uplink block. In block 16-3, the network performs the allocation such that the poll and the at least one USF are such that, considering a radio block period in which a PAN is to be sent, the polling for the PAN always is always used to allocate the earliest uplink block of the plurality of uplink blocks.

In some embodiments, the mobile station is configured to implement one of the other embodiments described herein, for example, the first, second or fourth embodiment, when the network allocation is not in line with that expected by the third embodiment, for example as might be the case if a base station were misconfigured. By proceeding in this manner, the mobile station is able to proceed with coding data blocks in advance.

FOURTH EMBODIMENT

Configure the Mobile Station to be Allowed to Include the PAN Sent in Response to the Poll on any Uplink Timeslot in the Appropriate Radio Block Period which is Allocated to the Mobile, Irrespective of within which Timeslot the Poll is Received In this embodiment, the mobile station is allowed to include the PAN sent in response to the poll on any uplink timeslot in the appropriate radio block period which is allocated to the mobile station, irrespective of within which timeslot the poll is received. The mobile station is configured to respect block sequence numbering for this embodiment. More generally, in some embodiments, the mobile station is further configured to implement another method of responding to a poll for an RLC data block plus PAN in the event scheduling by the network fails to ensure that the mobile station can transmit blocks in a particular order and respond to the poll in a same time slot as used for the poll so as to allow the mobile station to encode blocks in advance.

Figure 14:
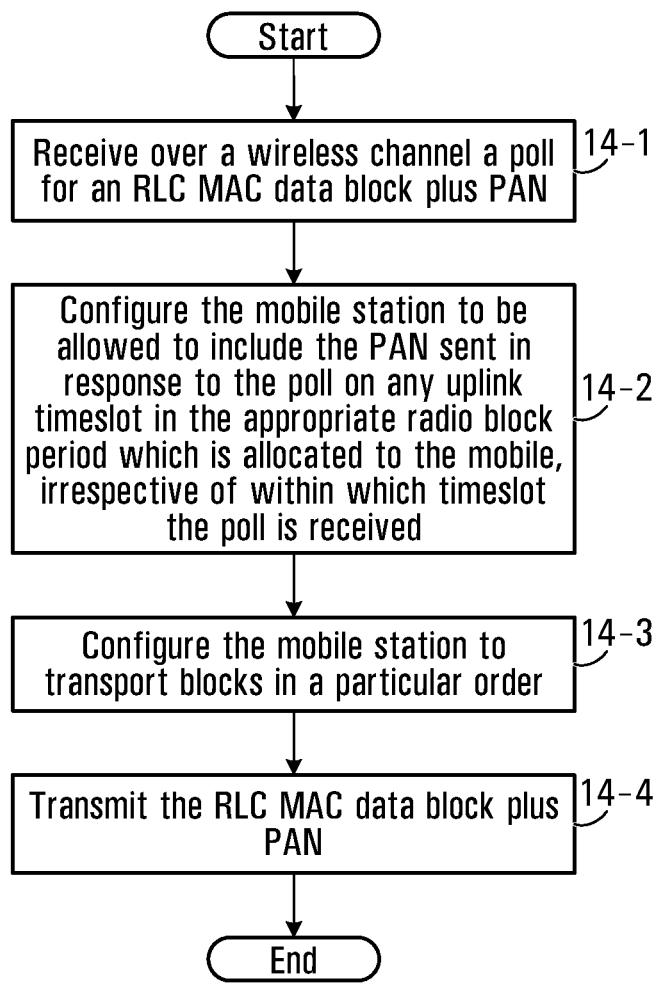

A flowchart of a method corresponding to this embodiment is shown in FIG. 14. The method begins at block 14-1 with receiving over a wireless channel a poll for an RLC/MAC data block plus PAN. Block 14-2 involves configuring the mobile station to be allowed to include the PAN sent in response to the poll on any uplink timeslot in the appropriate radio block period which is allocated to the mobile, irrespective of within which timeslot the poll is received. In block 14-3, the mobile station is configured to respect block sequence numbering. In block 14-4, the mobile station transmits the RLC/MAC data block including the PAN. In some embodiments, the method further comprises the mobile station encoding the RLC/MAC data block including a PAN in advance of knowing which, if any, USF will be received to allocate an uplink data block transmission in the same timeslot allocated by the poll, and in advance of knowing which, if any, USF will be received to allocate uplink data block transmission in any timeslot lower than the timeslot allocated by the poll within the same block period.

Note that in practice, the fourth embodiment may reduce to the second embodiment, because, even given the freedom of the fourth embodiment, the mobile station may still need to assume the worst case scenario, which is that it is not allocated any additional resources (other than by the poll). As such, it would proceed with encoding the PAN with the block which it would transmit if it was only allowed to transmit one block.

The first, second and third embodiments can be summarized as follows:

the PAN is encoded together with the block which the mobile station would transmit if it was only allowed to transmit one block (on the resource allocated by the poll). Then, the difference between the first embodiment vs. the second and third embodiments is the order in which the blocks are transmitted, and the difference between the second and third embodiments is whether the behaviour is enforced by the network as in the third embodiment, or simply carried out by the mobile station as in the second embodiment.

Table 1 below contains a summary of the rules applicable to each embodiment, and some advantages/disadvantages that may be realized.

TABLE 1 summary of embodiments

| Embodiment | Blocks sent in sequence? | PAN sent on same timeslot number as poll? | Advantages | Disadvantages |
| --- | --- | --- | --- | --- |
| First | Maybe not | Y | Easier for network: the timeslot on which the PAN will occur is deterministic | Network is required to re-order uplink blocks before evaluating whether blocks are missing |
| Second | Y | Not necessarily | Deterministic for network (knows that PAN is on first allocated block) | |
| Third | Y | Y | Straightforward for the mobile - obey existing rules as for PACCH; Mobile behaviour is deterministic | More complex scheduling for the network |
| Fourth | Y | Not necessarily | High flexibility for mobile station | Mobile behaviour is non-deterministic; Network does not know when the PAN will be sent |

In all cases, the principle benefit is that the mobile is able to (but not necessarily required to) encode RLC/MAC data blocks, including PAN(s) as required, in advance of knowing which (if any) USFs will be sent to allocate uplink resources.

Figure 15:
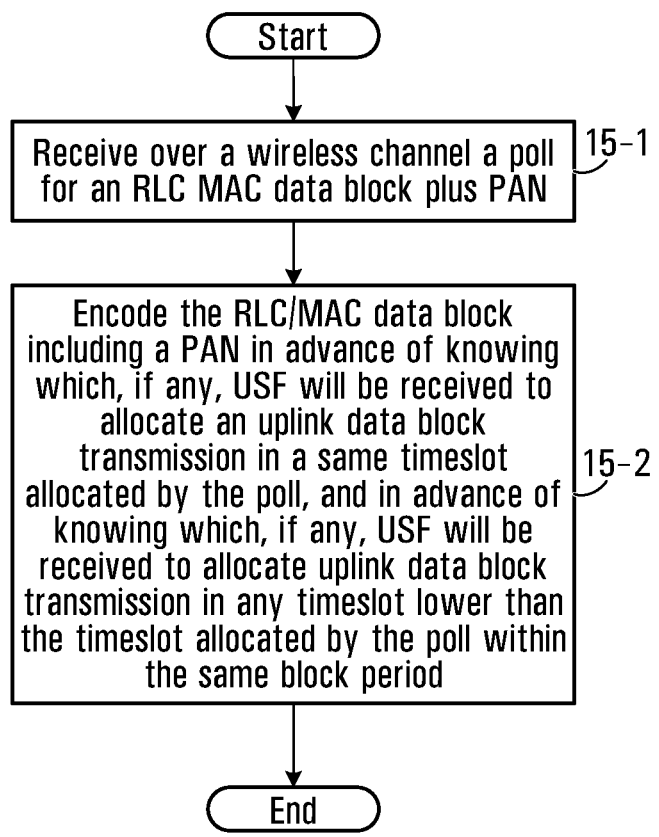

A flowchart of a method provided by an embodiment of the application is shown in FIG. 15. The method is executed by a mobile station and begins in block 15-1 with receiving over a wireless channel a poll for an RLC/MAC data block plus PAN. In block 15-2, the mobile station encodes an RLC/MAC data block including a PAN in advance of knowing which, if any, USF will be received to allocate an uplink data block transmission in the same timeslot allocated by the poll, and in advance of knowing which, if any, USF will be received to allocate uplink data block transmission in any timeslot lower than the timeslot allocated by the poll within the same block period.

Figure 8:
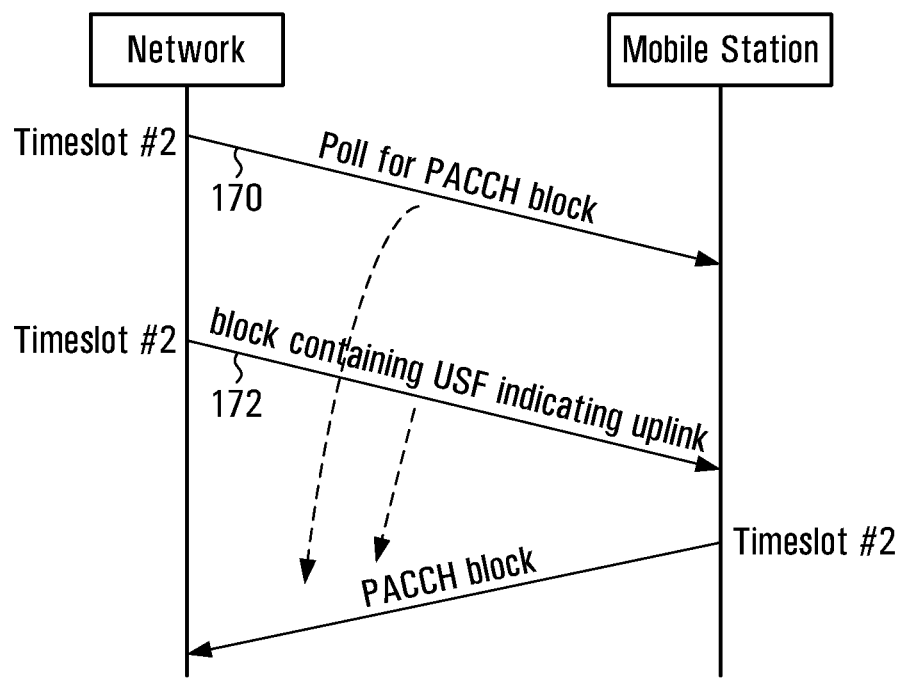
FIG. 8 is a message exchange diagram showing both a poll and a USF allocating the same uplink transmission opportunity.

The network should always ensure when allocating uplink resources, that allocations by polls and allocations by USFs do not "collide" i.e. assign the same uplink resource to different mobile stations. In the example of FIG. 8, the same timeslot is allocated with a poll at 170, and with a USF at 172. A USF on the timeslot used for a poll in any event must either belong to the same mobile station as is polled, or must be an unused value. Every downlink slot contains a USF, and the USF may refer to an assigned TBF, or not. Thus, a USF containing an unused value simply means that the USF does not refer to any assigned TBF. However, note that it is not necessary that a USF (i.e. USF 172) be sent which belongs to the same mobile station in this case—indeed, this may be impossible if the mobile has no uplink TBF or no uplink assignment on timeslot #2.

EMBODIMENT

USF and Poll Refer to Different Timeslots, and Poll Sent on Timeslot Different from that of Poll Another embodiment provides a specific way of dealing with the situation where a USF and a poll each refer to different timeslots, and a response to the poll is sent on a timeslot different from that of the poll. In some embodiments, such as the second and fourth embodiments described above, the mobile station does not necessarily transmit the RLC data block with PAN on the same timeslot number as that on which the poll was received. Note that this implies that the mobile station also received another valid USF allocating another uplink block, which implies that the mobile has an ongoing uplink TBF.

In some embodiments, the mobile station is configured to treat the poll as an allocation for the transmission of an uplink RLC data block on the block indicated by the poll, on the same timeslot as the poll was received, and to transmit an RLC data block as if that uplink block had been allocated by means of a USF (whether or not the block was actually allocated by a valid USF for that mobile).

Figure 9:
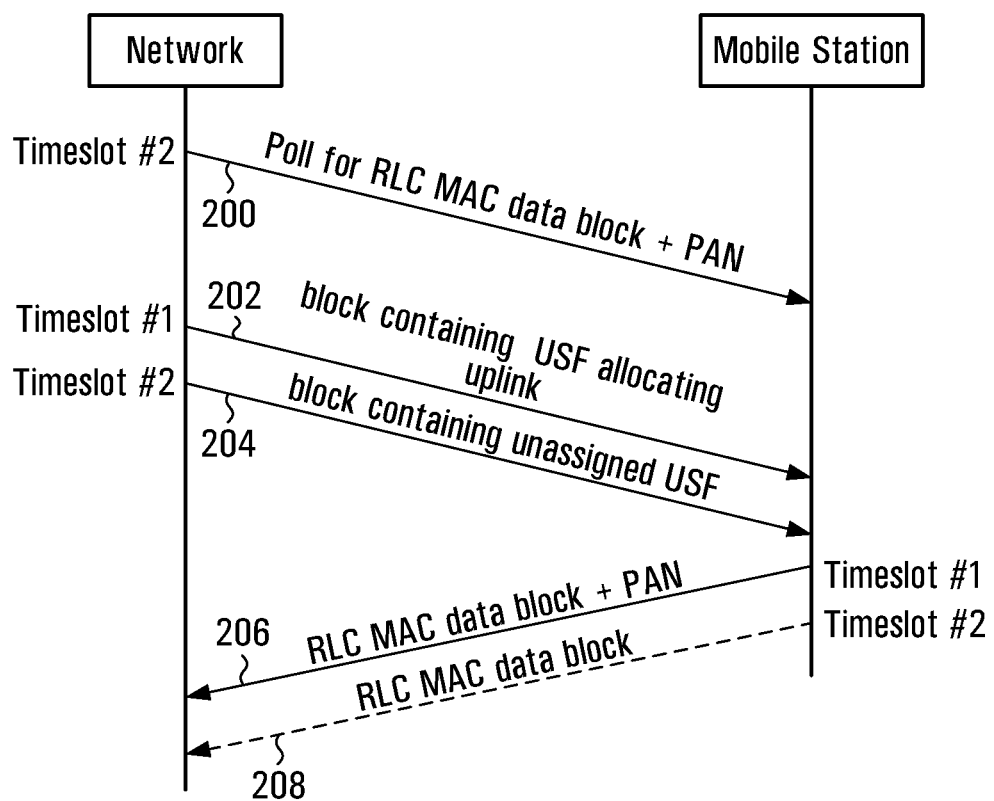
FIG. 9 is a message exchange diagram for a poll for RLC data block+PAN in accordance with an embodiment of the application.

An example of this behaviour is depicted in FIG. 9. The network transmits a Poll for RLC/MAC data block+PAN in timeslot #2 to a mobile station at 200. The network transmits a block containing a USF allocation to the same mobile station at 202 in timeslot #1, and transmits a block containing a unassigned USF at 204 in timeslot #2. Transmitting the unassigned USF is equivalent to not assigning the timeslot to another user. In response, the combination of the USF assigning timeslot #1, and the poll transmitted on timeslot #2 are collectively treated as an uplink allocation for RLC/MAC block transmission on both slot 1 and slot 2. Thus, the mobile station sends an RLC/MAC data block+PAN on timeslot #1 at 206. In so doing, the mobile sends the PAN on a different timeslot (timeslot #1) from the one which the poll was received (timeslot #2) (consistent with second and fourth embodiments described above), but, no USF was received by the mobile station explicitly allocating an uplink data block on timeslot #2. The mobile station acts as if it had received a valid USF allocating it resources on timeslot #2 (even if it has no uplink assignment on that timeslot, meaning that there was no possible USF value that could have been sent to allocate the resource) by transmitting an RLC data block on timeslot #2 at 208.

The above described embodiments have assumed that a mobile station receiving an allocation or poll on timeslot #n is expected to transmit on timeslot #n, subject to the exceptions detailed to deal with the RLC/MAC data block+PAN situation. This is applicable, for example, to the BTTI allocation described in the background. The embodiments described herein are also generally applicable to pair-wise allocation in which case a mobile station receiving an allocation or poll on a pair of downlink timeslots is expected to transmit on a corresponding pair of uplink timeslots. The timeslot numbers of the downlink timeslot-pairs and the timeslot numbers of the corresponding uplink timeslot-pairs on which responses are sent need not be the same, but there is a predetermined relationship in the timeslot numbers for the uplink timeslot-pairs to the downlink timeslot-pairs. This is the case, for example, with RTTI (reduced transmission time interval) allocations.

Thus, for both BTTI and RTTI, the allocated uplink slots correspond with the downlink slots containing USFs, but the nature of the correspondence is different. For BTTI, the corresponding slots have the same slot number. For RTTI, the corresponding slots do not necessarily have the same slot number. Therefore, for RTTI implementations, references to "same timeslot number" applicable to BTTI can be taken to refer to "corresponding timeslot-pair". 3GPP specifications also refer to "PDCH-pair" which is essentially synonymous with "timeslot-pair".

Figure 17:
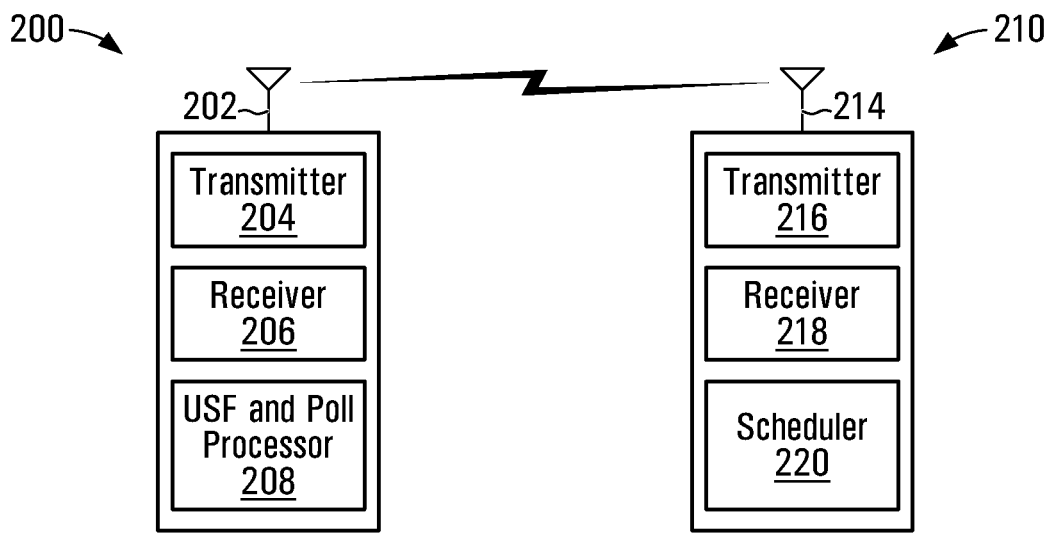
FIG. 17 is a block diagram of a system for implementing the transmission of a poll for RLC data block+PAN in a network, and the response to the poll by a mobile station.

FIG. 17 is a block diagram of a system within which one or more of the embodiments described above may be implemented. There is a mobile station 200 in wireless communication with a network, as represented by network device 210. The mobile station 200 has at least one antenna 202, a transmitter 202 and a receiver 204 (which may be implemented together as a transceiver) and a USF and poll processor 208. The USF and poll processor is implemented in hardware, or a combination of software and hardware, for example software running on a processor. The network device 210 has at least one antenna 214, a transmitter 216 and a receiver 218 (which may be implemented together as a transceiver) and a scheduler 220. The scheduler is implemented in hardware, or a combination of software and hardware, for example software running on a processor.

In FIG. 17, the scheduler and the transmitter plus receiver are shown as part of the same network component. In other embodiments, these elements are implemented as part of different network elements. For example, the scheduler may be implemented within a BSC (base station controller), and the transmitter plus receiver implemented within a base station.

In operation, the scheduler is responsible for determining which mobile stations (such as mobile station 202) are to get which uplink resources. The scheduler determines when to transmit USFs allocating uplink resources, and when to transmit a poll for an RLC/MAC block+PAN. A particular embodiment of the application provides a network device 210 in which the scheduler 220, transmitter 216 and receiver 218 are configured to implement the method of FIG. 14 described above.

In operation, the USF and poll process 208, the transmitter 204 and receiver 206 collectively receive USFs and polls, and generate and transmit uplink data blocks in response. In a particular embodiment, the application provides a mobile device 200 in which the transmitter 204, the receiver 206 and the USF and poll processor 208 are collectively configured to implement the method of FIG. 9, the method of FIG. 10, the method of FIG. 11, the method of FIG. 12, or the method of FIG. 13.

Wireless Device

Figure 10:
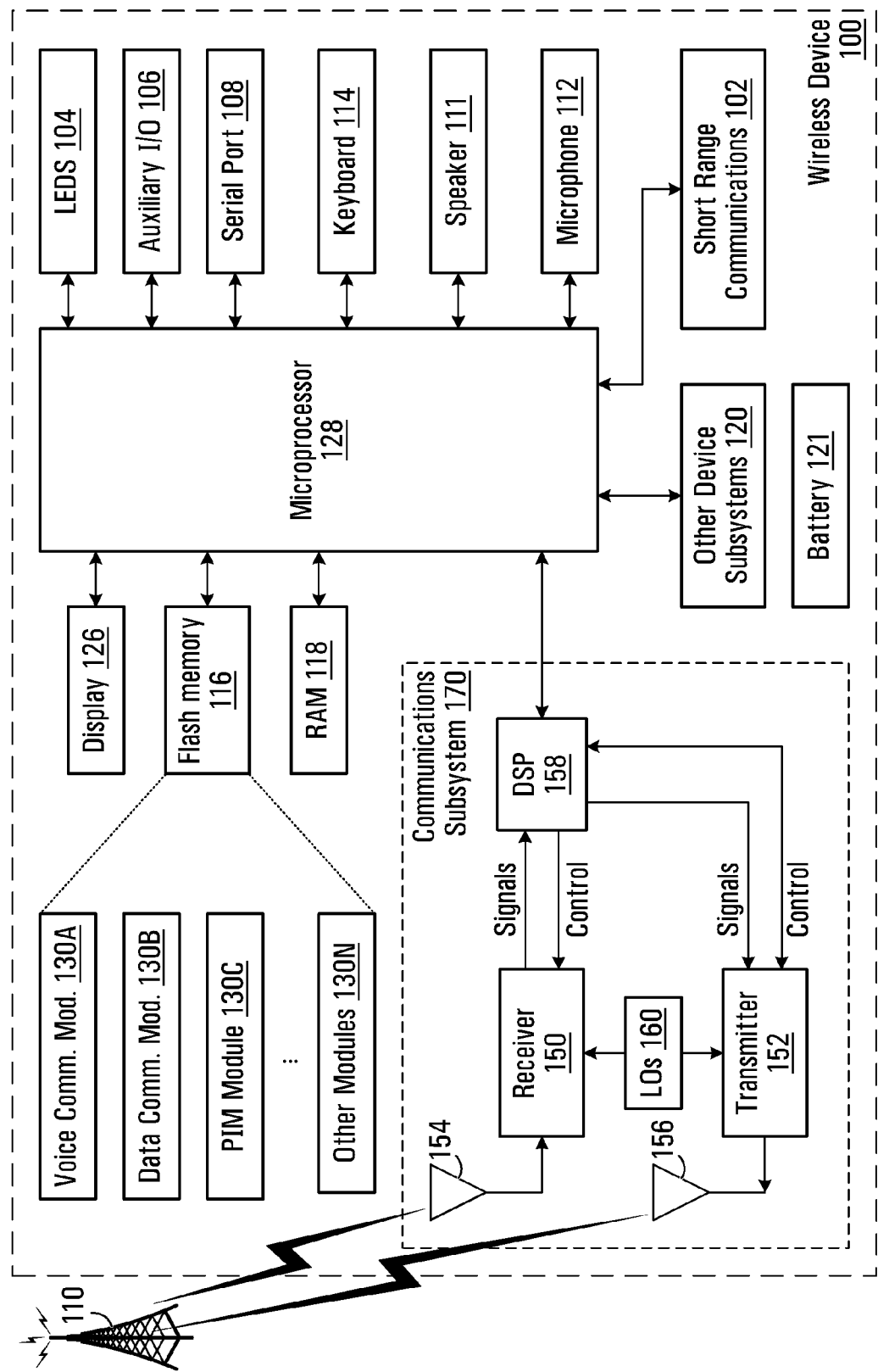
FIG. 10 is a block diagram of an example implementation of a mobile station.

Referring now to FIG. 10, shown is a block diagram of a wireless device 100 that may, for example, implement any of the mobile device methods described in this disclosure. It is to be understood that the wireless device 100 is shown with very specific details for exemplary purposes only. A processing device (a microprocessor 128) is shown schematically as coupled between a keyboard 114 and a display 126. The microprocessor 128 controls operation of the display 126, as well as overall operation of the wireless device 100, in response to actuation of keys on the keyboard 114 by a user.

The wireless device 100 has a housing that may be elongated vertically, or may take on other sizes and shapes (including clamshell housing structures). The keyboard 114 may include a mode selection key, or other hardware or software for switching between text entry and telephony entry.

In addition to the microprocessor 128, other parts of the wireless device 100 are shown schematically. These include: a communications subsystem 170; a short-range communications subsystem 102; the keyboard 114 and the display 126, along with other input/output devices including a set of LEDs 104, a set of auxiliary I/O devices 106, a serial port 108, a speaker 111 and a microphone 112; as well as memory devices including a flash memory 116 and a Random Access Memory (RAM) 118; and various other device subsystems 120. The wireless device 100 may have a battery 121 to power the active elements of the wireless device 100. The wireless device 100 is in some embodiments a two-way radio frequency (RF) communication device having voice and data communication capabilities. In addition, the wireless device 100 in some embodiments has the capability to communicate with other computer systems via the Internet.

Operating system software executed by the microprocessor 128 is in some embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the wireless device 100 may also be stored to the RAM 118.

The microprocessor 128, in addition to its operating system functions, enables execution of software applications on the wireless device 100. A predetermined set of software applications that control basic device operations, such as a voice communications module 130A and a data communications module 130B, may be installed on the wireless device 100 during manufacture. In addition, a personal information manager (PIM) application module 130C may also be installed on the wireless device 100 during manufacture. The PIM application is in some embodiments capable of organizing and managing data items, such as e-mail, calendar events, voice mails, appointments, and task items. The PIM application is also in some embodiments capable of sending and receiving data items via a wireless network 110. In some embodiments, the data items managed by the PIM application are seamlessly integrated, synchronized and updated via the wireless network 110 with the device user's corresponding data items stored or associated with a host computer system. As well, additional software modules, illustrated as another software module 130N, may be installed during manufacture.

Communication functions, including data and voice communications, are performed through the communication subsystem 170, and possibly through the short-range communications subsystem 102. The communication subsystem 170 includes a receiver 150, a transmitter 152 and one or more antennas, illustrated as a receive antenna 154 and a transmit antenna 156. In addition, the communication subsystem 170 also includes a processing module, such as a digital signal processor (DSP) 158, and local oscillators (LOs) 160. The communication subsystem 170 having the transmitter 152 and the receiver 150 includes functionality for implementing one or more of the embodiments described above in detail. The specific design and implementation of the communication subsystem 170 is dependent upon the communication network in which the wireless device 100 is intended to operate. For example, the communication subsystem 170 of the wireless device 100 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Examples of CDMA include 1X and 1x EV-DO. The communication subsystem 170 may also be designed to operate with an 802.11 Wi-Fi network, and/or an 802.16 WiMAX network. Other types of data and voice networks, both separate and integrated, may also be utilized with the wireless device 100.

Network access may vary depending upon the type of communication system. For example, in the Mobitex™ and DataTAC™ networks, wireless devices are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the wireless device 100 may send and receive communication signals over the communication network 110. Signals received from the communication network 110 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 110 are processed (e.g., modulated and encoded) by the DSP 158 and are then provided to the transmitter 152 for digital to analog conversion, frequency up conversion, filtering, amplification and transmission to the communication network 110 (or networks) via the transmit antenna 156.

In addition to processing communication signals, the DSP 158 provides for control of the receiver 150 and the transmitter 152. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 170 and is input to the microprocessor 128. The received signal is then further processed by the microprocessor 128 for an output to the display 126, or alternatively to some other auxiliary I/O devices 106. A device user may also compose data items, such as e-mail messages, using the keyboard 114 and/or some other auxiliary I/O device 106, such as a touchpad, a rocker switch, a thumb-wheel, or some other type of input device. The composed data items may then be transmitted over the communication network 110 via the communication subsystem 170.

In a voice communication mode, overall operation of the device is substantially similar to the data communication mode, except that received signals are output to a speaker 111, and signals for transmission are generated by a microphone 112. Alternative voice or audio I/O subsystems, such as a voice message recording subsystem, may also be implemented on the wireless device 100. In addition, the display 126 may also be utilized in voice communication mode, for example, to display the identity of a calling party, the duration of a voice call, or other voice call related information.

The short-range communications subsystem 102 enables communication between the wireless device 100 and other proximate systems or devices, which need not necessarily be similar devices. For example, the short range communications subsystem may include an infrared device and associated circuits and components, or a Bluetooth™ communication module to provide for communication with similarly-enabled systems and devices.

In some implementations, the wireless device 100 is capable of operating in multiple modes such that it can engage in both CS (Circuit-Switched) as well as PS (Packet-Switched) communications, and can transition from one mode of communications to another mode of communications without loss of continuity. Other implementations are possible.

In a particular embodiment, one or more of the above-described methods for allocating and transmitting uplink data block transmissions with piggy-backed ACK/NACK bitmap are implemented by the communications subsystem 170, the microprocessor 128, the RAM 118, and the data communications module 130B, collectively appropriately configured to implement one of the methods described herein.

All of the embodiments described above refer to the use of a poll for allocation of an uplink RLC block with PAN, and to the subsequent transmission of an RLC block with PAN. More generally, embodiments are applicable to the allocation and/or transmission of an uplink radio block within a specified radio block period for transmission of user data in combination with control information, hereinafter an DBCCI (Data Block Combined with Control Information). The ACK/NACK requested in the allocation and/or transmission of uplink RLC block with PAN is a specific example of control information. An RLC block is a specific example of an uplink radio block. Thus, and RLC block with PAN is a specific example of an DBCCI. A poll for an RLC data block plus PAN is a specific example of a request for a DBCCI.

All of the embodiments described above refer to the allocation of uplink RLC blocks through the USF mechanism. More generally, these embodiments are applicable for any allocation mechanism for allocating an uplink radio block for the purpose transmission of user data. The transmission of such an allocation will be referred to as the transmission of an UADB (uplink allocation for data block). The USF is a specific example of an UADB.

The embodiments have for the most part been described as methods. Further embodiments provide a computer readable medium having computer executable instructions stored thereon for execution by a mobile station which when executed, cause the mobile station to perform any of the methods described herein.

Further embodiments provide a computer readable medium having computer executable instructions stored thereon for execution by a network device or network devices which executed, cause the network device or network devices to perform any of the network methods described herein.

Further embodiments provide a mobile station configured to perform any of the mobile station methods described herein. Such a mobile station may, for example, comprise at least one antenna, at least one wireless access radio, and one or a combination of components that control the mobile station to perform one of the methods. In some embodiments, the one or a combination of components comprises at least one processor. In a specific example, the one or a combination of components comprise a communications subsystem such as communications subsystem of 170 of FIG. 10. In another specific example, the components comprise the USF and poll processor 208 of FIG. 17. The one or a combination of components may comprise hardware, or hardware in combination with software and/or firmware that is stored so as to be accessible and executed by the hardware.

Further embodiments provide a network device or network devices configured to perform any of the network methods described herein.

Numerous modifications and variations of the present application are possible in light of the above teachings. It is therefore to be understood that within the scope of the appended claims, embodiments may be practiced otherwise than as specifically described herein.

We claim:

1. A method for a mobile station, the method comprising:
receiving over a wireless channel a request for a DBCCI (Data Block Combined with Control Information);
upon receiving the request, encoding data blocks and the DBCCI prior to receiving Uplink Allocation for Data Blocks (UADBs) defining a particular order for transmitting the data blocks and DBCCI;
transmitting the DBCCI in response to the request using at least one timeslot corresponding to a timeslot used for the request for DBCCI; and
transmitting the data blocks out of the particular order within at least one radio block period where the mobile station is responding to the request for the DBCCI.

2. The method of claim 1 wherein transmitting a DBCCI in response to the request using at least one timeslot corresponding to a timeslot used for the request for DBCCI comprises:
transmitting a BTTI (Basic Transmit Time Interval) block using an uplink slot having the same number as a downlink slot used for the request.

3. The method of claim 1 wherein transmitting a DBCCI in response to the request using at least one timeslot corresponding to a timeslot used for the request for DBCCI comprises:
transmitting an RTTI (Reduced Transmit Time Interval) block using an uplink slot pair corresponding with a downlink slot pair used for the request.

4. The method of claim 1 further comprising:
receiving at least one UADB (uplink allocation for data block), each UADB indicating an allocation of a respective uplink block;
transmitting within a given radio block period one or more uplink data blocks using the uplink timeslot(s) allocated by the at least one UADB other than the timeslot used to transmit the DBCCI, each such data block having a higher block sequence number than the block sequence number(s) of data block(s) being sent as part of the DBCCI.

5. The method of claim 1 wherein the particular order involves initial transmissions occurring in block sequence number order.

6. The method of claim 1 wherein the request for a DBCCI (Data Block Combined with Control Information) is a poll for RLC (radio link control) data block+PAN (piggy backed ACK/NACK).

7. The method of claim 2 wherein the request for a DBCCI (Data Block Combined with Control Information) is a poll for RLC (radio link control) data block+PAN (piggy backed ACK/NACK).

8. The method of claim 3 wherein the request for a DBCCI (Data Block Combined with Control Information) is a poll for RLC (radio link control) data block+PAN (piggy backed ACK/NACK).

9. The method of claim 4 wherein the request for a DBCCI (Data Block Combined with Control Information) is a poll for RLC (radio link control) data block+PAN (piggy backed ACK/NACK).

10. The method of claim 5 wherein the request for a DBCCI (Data Block Combined with Control Information) is a poll for RLC (radio link control) data block+PAN (piggy backed ACK/NACK).

11. The method of claim 4 wherein each UADB is a USF (uplink state flag).

12. A non-transitory, computer readable medium having computer executable instructions stored thereon for execution by a mobile station which when executed, cause the mobile station to perform a method comprising:
receiving over a wireless channel a request for a DBCCI (Data Block Combined with Control Information);
upon receiving the request, encoding data blocks and the DBCCI prior to receiving Uplink Allocation for Data Blocks (UADBs) defining a particular order for transmitting the data blocks and DBCCI;
transmitting the DBCCI in response to the request using at least one timeslot corresponding to a timeslot used for the request for DBCCI; and
transmitting the data blocks out of the particular order within at least one radio block period where the mobile station is responding to the request for the DBCCI.

13. The computer readable medium of claim 12 wherein the method further comprises:
transmitting a DBCCI in response to the request using at least one timeslot corresponding to a timeslot used for the request for DBCCI comprises:
transmitting a BTTI (Basic Transmit Time Interval) block using an uplink slot having the same number as a downlink slot used for the request.

14. The computer readable medium of claim 12 wherein transmitting a DBCCI in response to the request using at least one timeslot corresponding to a timeslot used for the request for DBCCI comprises:
transmitting an RTTI (Reduced Transmit Time Interval) block using an uplink slot pair corresponding with a downlink slot pair used for the request.

15. The computer readable medium of claim 12 further comprising:
receiving at least one UADB (uplink allocation for data block), each UADB indicating an allocation of a respective uplink block;
transmitting within a given radio block period one or more uplink data blocks using the uplink timeslot(s) allocated by the at least one UADB other than the timeslot used to transmit the DBCCI, each such data block having a higher block sequence number than the block sequence number(s) of data block(s) being sent as part of the DBCCI.

16. The computer readable medium of claim 12 wherein the request for a DBCCI (Data Block Combined with Control Information) is a poll for RLC (radio link control) data block+PAN (piggy backed ACK/NACK).

17. The computer readable medium of claim 15 wherein the request for a DBCCI (Data Block Combined with Control Information) is a poll for RLC (radio link control) data block+PAN (piggy backed ACK/NACK).

18. A mobile station comprising:
at least one antenna;
at least one wireless access radio;
a one or a combination of components configured to control the mobile station to:
  receive over a wireless channel a request for a DBCCI (Data Block Combined with Control Information);
  upon receiving the request, encode data blocks and the DBCCI prior to receiving Uplink Allocation for Data Blocks (UADBs) defining a particular order for transmitting the data blocks and DBCCI;
  transmit the DBCCI in response to the request using at least one timeslot corresponding to a timeslot used for the request for DBCCI; and
  transmit the data blocks out of the particular order within at least one radio block period where the mobile station is responding to the request for the DBCCI.

19. The mobile station of claim 18 wherein the one or a combination of components is further configure control the mobile station to:
  transmit a DBCCI in response to the request using at least one timeslot corresponding to a timeslot used for the request for DBCCI comprises:
  transmit a BTTI (Basic Transmit Time Interval) block using an uplink slot having the same number as a downlink slot used for the request.

20. The mobile station of claim 18 wherein the one or a combination of components is further configured to control the mobile station to:
  transmit the DBCCI in response to the request using at least one timeslot corresponding to the timeslot used for the request for DBCCI comprises by transmitting an RTTI (Reduced Transmit Time Interval) block using an uplink slot pair corresponding with a downlink slot pair used for the request.

21. The mobile station of claim 18 wherein the one or a combination of components is further configured to control the mobile station to:
  receive at least one UADB (uplink allocation for data block), each UADB indicating an allocation of a respective uplink block;
  transmit within a given radio block period one or more uplink data blocks using the uplink timeslot(s) allocated by the at least one UADB other than the timeslot used to transmit the DBCCI, each such data block having a higher block sequence number than the block sequence number(s) of data block(s) being sent as part of the DBCCI.

22. The mobile station of claim 18 wherein the request for a DBCCI (Data Block Combined with Control Information) is a poll for RLC (radio link control) data block+PAN (piggy backed ACK/NACK).

23. The mobile station of claim 20 wherein the request for a DBCCI (Data Block Combined with Control Information) is a poll for RLC (radio link control) data block+PAN (piggy backed ACK/NACK).

* * * * *

UNITED STATES PATENT AND TRADEMARK OFFICE
CERTIFICATE OF CORRECTION

PATENT NO. : 8,670,433 B2
APPLICATION NO. : 12/729534
DATED : March 11, 2014
INVENTOR(S) : Dennis Conway, Satish Venkob and David Philip Hole Page 1 of 1

It is certified that error appears in the above-identified patent and that said Letters Patent is hereby corrected as shown below:

In the Claims

In Column 19, In Line 19, In Claim 19, delete "configure control" and insert -- configured to control --, therefor.

Signed and Sealed this
Seventeenth Day of June, 2014

Michelle K. Lee
*Deputy Director of the United States Patent and Trademark Office*